US008011929B2

(12) United States Patent
Chen

(10) Patent No.: US 8,011,929 B2

(45) Date of Patent: Sep. 6, 2011

(54) METHOD FOR COLORING A COLORING CARD

(76) Inventor: Teng-Kuei Chen, Taipei (TW)

( * ) Notice: Subject to any disclaimer, the term of this patent is extended or adjusted under 35 U.S.C. 154(b) by 777 days.

(21) Appl. No.: 12/027,182

(22) Filed: Feb. 6, 2008

(65) Prior Publication Data

US 2009/0193987 A1 Aug. 6, 2009

(51) Int. Cl.
*G09B 11/10* (2006.01)

(52) U.S. Cl. ........................................................ 434/84

(58) Field of Classification Search .................... 434/81, 434/84, 85, 98

See application file for complete search history.

(56) References Cited

U.S. PATENT DOCUMENTS

| | | | | |
|---|---|---|---|---|
| 2,065,266 | A * | 12/1936 | Connelly | 427/11 |
| 2,217,270 | A * | 10/1940 | Gibbs | 434/84 |
| 3,802,904 | A * | 4/1974 | Morrison | 427/282 |
| 4,279,674 | A * | 7/1981 | Wadden | 156/62 |
| 4,416,632 | A * | 11/1983 | Berman | 434/84 |
| 4,996,087 | A * | 2/1991 | Rebstock | 428/11 |
| 5,163,846 | A * | 11/1992 | Lee | 434/408 |
| 5,213,504 | A * | 5/1993 | Lee et al. | 434/84 |
| 5,788,501 | A * | 8/1998 | Hassall | 434/84 |
| 6,786,728 | B2 * | 9/2004 | Leblanc et al. | 434/84 |
| 2005/0275214 | A1 * | 12/2005 | Pokempner et al. | 283/95 |

* cited by examiner

*Primary Examiner* — Kurt Fernstrom

(74) *Attorney, Agent, or Firm* — patenttm.us

(57) ABSTRACT

A coloring method has acts of: (a) preparing a substrate having at least one display surfaces and each display surface printed with an ink layer to form a coloring area having multiple resin units mounted in the coloring area; (b) coloring the coloring area of the substrate with water-based colorants; and (c) rubbing the coloring area of the substrate. The coloring area is colored and rubbing alternately to display a special effect, like colored leather. Moreover, the coloring area can be colored by blending red, blue and yellow to obtain various colored results. The present invention is able to stimulate, inspire and develop color sensibility for children.

18 Claims, 4 Drawing Sheets

METHOD FOR COLORING A COLORING CARD

BACKGROUND OF THE INVENTION

1. Field of the Invention

The present invention relates to a coloring method, especially, relates to a coloring method to inspire and develop color sensibility for children.

2. Description of the Related Art

A conventional coloring book is usually used to inspire and develop children's sensibility in color, for general entertainment and to improve fine motor control in preparation for developing writing skills. The conventional coloring book comprises multiple pages with lines containing areas for children to add color with crayons, colored pencils, markers and paint.

In another conventional coloring book, some packed pigments are formed inside the coloring area of the coloring book. The coloring area of the coloring book is painted with water, causing the pigments to show in the coloring area.

The foregoing conventional coloring books however, become tedious and a new method for coloring a coloring card is required for added stimulation.

SUMMARY OF THE INVENTION

The main objective of the present invention is to provide a coloring method to display a special effect.

To achieve the foregoing objective, a coloring method in accordance with the present invention, comprising the acts of: (a) preparing a substrate having at least one display surface and each display surface printed with an ink layer to form a coloring area having multiple resin units mounted in the coloring area; (b) coloring the coloring area of the substrate with water-based colorants; and (c) rubbing the coloring area of the substrate. The coloring area is colored and rubbed alternately to display a special effect, like colored leather. Moreover, the coloring area can be colored by blending primary colors, for example red, yellow and blue to obtain various colored results. The primary colors in the present invention refer to sets of colors that can be combined to make a gamut of colors. The present invention is able to stimulate, inspire and develop color sensibility for children.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
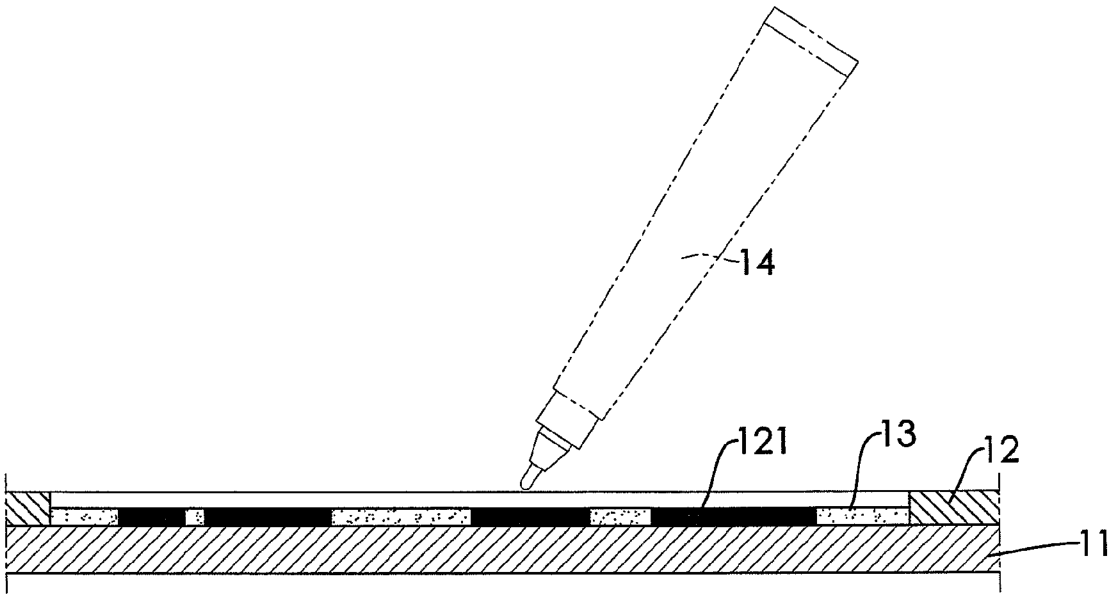
FIG. 1 is a cross sectional side view of a coloring card applied for a method in accordance with the present invention.

With reference to FIG. 1, a coloring card applied for a method in accordance with the present invention comprises a substrate (11).

The substrate (11) is made of any hydrophilic material, such as paper and has at least one display surface. Each display surface has an ink layer (12).

Figure 2:
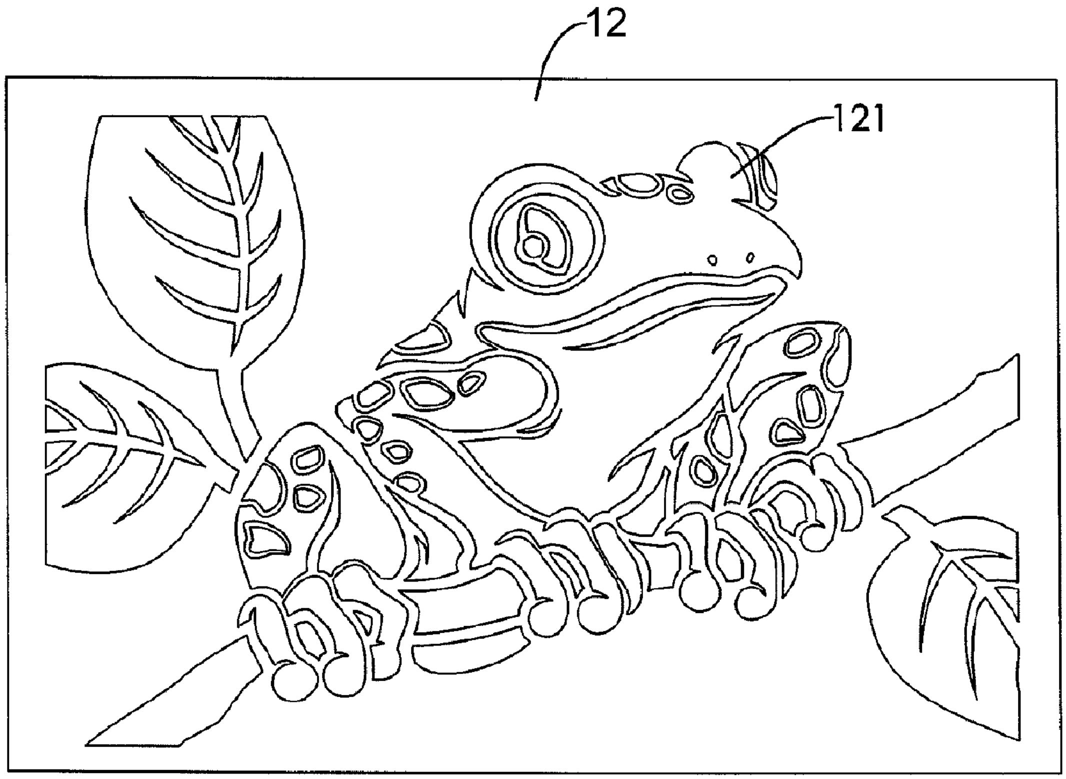
FIG. 2 is a front view of the coloring card in FIG. 1, showing a coloring area.
Figure 3:
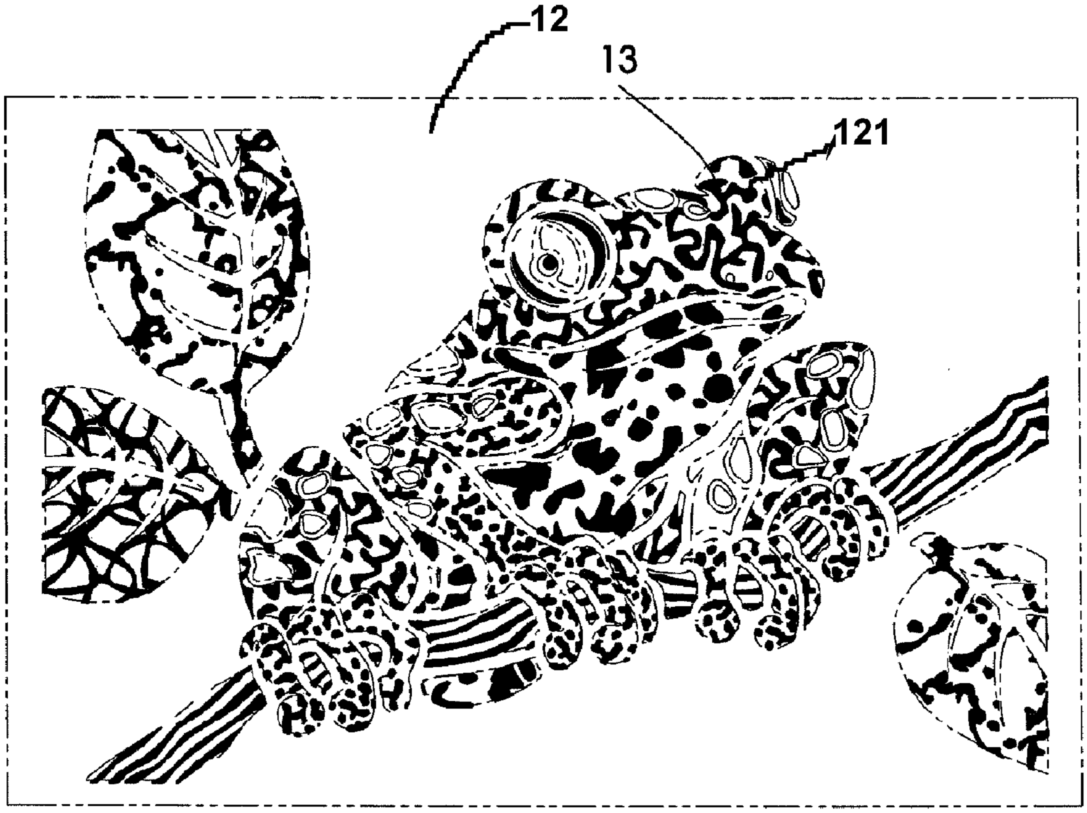
FIG. 3 is a front view of the coloring card in FIG. 1, showing multiple resin units formed in the coloring area.

With further reference to FIGS. 2 and 3, the ink layer (12) is applied on the display surface of the substrate (11) and may be printed on the display surface of the substrate (11) to form a coloring area (121).

The coloring area (121) is formed in the ink layer (12) with various patterns, such as portraits, animals, flowers and scenery and may be colored by the water-based colorants (14) and has multiple resin units (13). The colorants may be water-based pigments such as dyes, ink or paints.

The multiple resin units (13) are scattered and mounted in the coloring area (121) of the ink layer (12). The multiple resin units (13) may be made of oleo-resin, which is hydrophobic. The water-base pigments, for example dyes, inks or paints are unable to attach to the multiple resin units (13).

Figure 4:
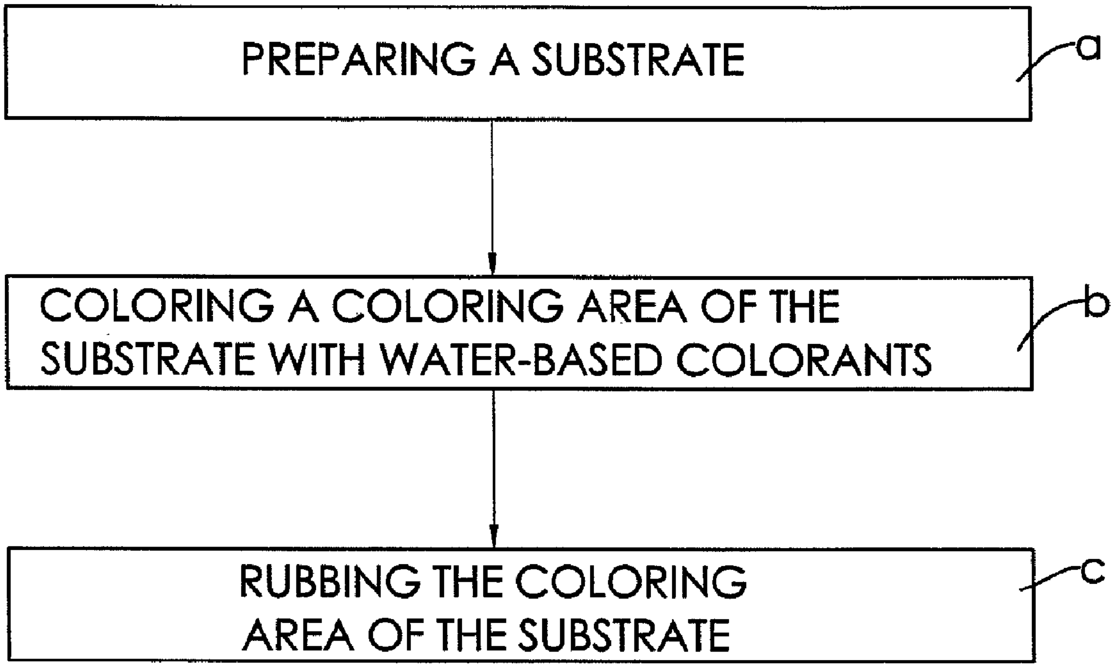
FIG. 4 is a flow chart of a method for coloring a coloring card in accordance with the present invention.

With further reference to FIG. 4, a method for coloring the coloring card discussed above in accordance with the present invention comprises acts of (a) preparing the substrate as illustrated above; (b) coloring the coloring area of the substrate with water-based colorants; and (c) rubbing the coloring area of the substrate.

In the act of (b) coloring the coloring area (121) of the substrate (11) with water-based colorants, the colorants may be a water-based pigments, dyes, inks or paints.

In the act of (c) rubbing the coloring area (121) of the substrate (11), the coloring area (121) may be rubbed by paper, cloth, non-woven cloth or the like.

The coloring area (121) of the ink layer (12) may be colored by blending primary colors to obtain various colored results. For example, blending with blue and red for purple, blue and yellow for green and red and yellow for red. In one aspect, to achieve the above colored results, the acts of (b) coloring with water based colorants and (c) rubbing the coloring area (121) of the substrate (11) are alternately repeated in order to achieve a special effect. In another aspect, the act of (b) coloring with water based colorants is repeated to blending colors and the act of (c) rubbing the coloring area (121) of the substrate (11) is followed.

Because the resin units (13) are unable to be attached by the water based colorants. Therefore, when the coloring area (121) is colored by a water-based pigment, dyes, inks or paints and then is rubbed, the water-base pigment, dyes, inks or paints is unable to attach to the oleo-resin and is rubbed away easily. The display surface only displays color in the coloring area (121) except the resin units (13). The coloring and rubbing steps are repeated to obtain a special, unique and stimulating effect, such as colored leathers.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for coloring a coloring card, comprising the acts of:

(a) preparing a coloring card having a substrate having at least one display surface and each one of the at least one display surface having an ink layer being applied on the display surface and having a coloring area formed in the ink layer and having multiple resin units being scattered and mounted in the coloring area of the ink layer;

(b) coloring the coloring area of the substrate with colorants having different colors, wherein the colorants are overlapped on the coloring area; and (c) rubbing the coloring area of the substrate to blend the colorants to present a color differing from each color of the colorants, and to remove the colorants on the resin units in the coloring area at the same time.

2. The coloring method as claimed in claim 1, wherein the acts of (b) coloring the coloring area of the substrate with colorants and the acts of (c) rubbing the coloring area of the substrate are alternately repeated.

3. The coloring method as claimed in claim 1, wherein the coloring area of the colored card is colored by blending red, blue and yellow.

4. The coloring method as claimed in claim 2, wherein the coloring area of the colored card is colored by blending red, blue and yellow.

5. The coloring method as claimed in claim 3, wherein the substrate of the coloring card is made of hydrophilic materials.

6. The coloring method as claimed in claim 4, wherein the substrate of the coloring card is made of hydrophilic materials.

7. The coloring method as claimed in claim 5, wherein the substrate of the coloring card is made of paper.

8. The coloring method as claimed in claim 6, wherein the substrate of the coloring card is made of paper.

9. The coloring method as claimed in claim 7, wherein the multiple resin units of the coloring card are oleo-resin.

10. The coloring method as claimed in claim 8, wherein the multiple resin units of the coloring card are oleo-resin.

11. The coloring method as claimed in claim 9, wherein the coloring area of the colored card is colored by water-based colorants.

12. The coloring method as claimed in claim 10, wherein the coloring area of the colored card is colored by water-based colorants.

13. The coloring method as claimed in claim 11, wherein the act of (c), the coloring area of the colored card is rubbed by paper.

14. The coloring method as claimed in claim 12, wherein the act of (c), the coloring area of the colored card is rubbed by paper.

15. The coloring method as claimed in claim 11, wherein the act of (c), the coloring area of the colored card is rubbed by cloth.

16. The coloring method as claimed in claim 12, wherein the act of (c), the coloring area of the colored card is rubbed by cloth.

17. The coloring method as claimed in claim 11, wherein the act of (c), the coloring area of the colored card is rubbed by non-woven cloth.

18. The coloring method as claimed in claim 12, wherein the act of (c), the coloring area of the colored card is rubbed by non-woven cloth.

* * * * *